(12) United States Patent
Huang et al.

(10) Patent No.: US 11,964,685 B2
(45) Date of Patent: Apr. 23, 2024

(54) SYSTEM AND METHOD FOR CONTROL OF CARTS AT A STATION FOR AN INDEPENDENT CART SYSTEM

(71) Applicant: Rockwell Automation Technologies, Inc., Mayfield Heights, OH (US)

(72) Inventors: Yuhong Huang, Acton, MA (US); Jesse R. Mendenhall, Brookline, NH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 179 days.

(21) Appl. No.: 17/666,104

(22) Filed: Feb. 7, 2022

(65) Prior Publication Data
US 2023/0249721 A1 Aug. 10, 2023

(51) Int. Cl.
*B61L 3/16* (2006.01)
*B61L 3/08* (2006.01)
*B61L 25/02* (2006.01)

(52) U.S. Cl.
CPC ................. *B61L 3/16* (2013.01); *B61L 3/08* (2013.01); *B61L 25/025* (2013.01)

(58) Field of Classification Search
CPC .. B61L 3/16; B61L 3/08; B61L 25/025; B60L 2200/44; B60L 13/03; B60L 15/002; B60L 15/005; B60L 13/006; B65G 43/00; B65G 54/02
See application file for complete search history.

(56) References Cited

U.S. PATENT DOCUMENTS

| | | | |
|---|---|---|---|
| 2019/0061558 A1* | 2/2019 | Craver | H02K 11/25 |
| 2019/0068101 A1* | 2/2019 | Sun | H01F 38/14 |
| 2019/0077608 A1* | 3/2019 | Huang | B65G 43/02 |
| 2019/0078950 A1* | 3/2019 | Huang | H02P 6/183 |
| 2019/0084781 A1* | 3/2019 | Huang | G05B 19/4185 |
| 2019/0097466 A1* | 3/2019 | Floresta | H02J 7/0068 |
| 2020/0017308 A1* | 1/2020 | Huang | B65G 54/02 |
| 2020/0148240 A1 | 5/2020 | Desotelle et al. | |
| 2020/0371522 A1* | 11/2020 | Wernersbach | G08G 1/00 |
| 2021/0253351 A1* | 8/2021 | Huang | G05B 19/042 |

OTHER PUBLICATIONS

European Search Report for Related Application No. 23150142.0 dated Jul. 10, 2023 (11 pages).

* cited by examiner

*Primary Examiner* — Joseph J Dallo
(74) *Attorney, Agent, or Firm* — Boyle Fredrickson, S.C.

(57) ABSTRACT

External interaction with a mover in an independent cart system is allowed at known locations along the track. The mover is initially propelled along the track in a first operating state. When the mover arrives at a station, the controller generates a signal to alert the external actuator of the presence of a mover at the station. After waiting at the station for a first predefined time interval, the controller switches to a second operating state, in which the coils are de-energized or the controller is reconfigured to operate in a less responsive manner than in the first operating state. The controller remains in the second operating state for a second predefined interval, during which the external actuator interacts with the mover or a load on the mover. After the second predefined interval, the controller enters a third operating state, and the controller propels the mover away from the station.

17 Claims, 8 Drawing Sheets

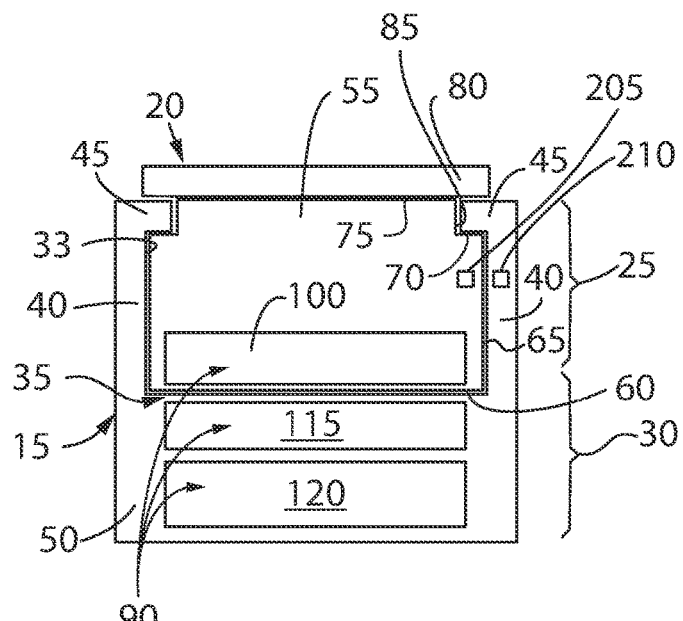
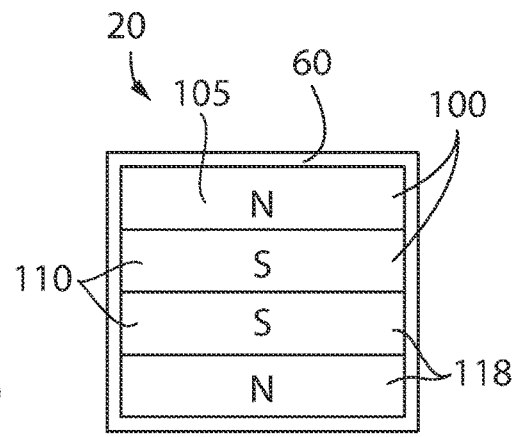
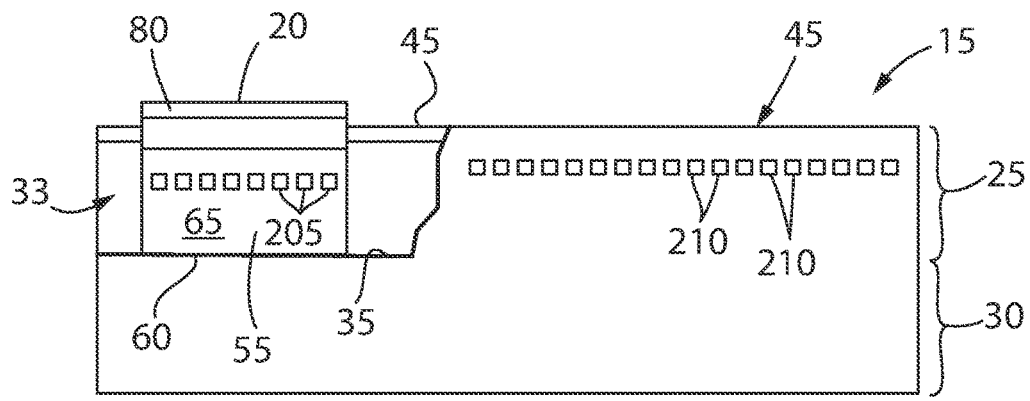

SYSTEM AND METHOD FOR CONTROL OF CARTS AT A STATION FOR AN INDEPENDENT CART SYSTEM

BACKGROUND INFORMATION

The subject matter disclosed herein relates to motion control for an independent cart system. More specifically, a system and method for temporarily limiting, or removing, current production at coils within a linear drive system for the independent cart system allows external actuators to interact with the independent carts without interference from the linear drive system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, also referred to herein as "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

During interaction with an external actuator, the external actuator may be configured to apply a force on the product loaded on the mover or to the mover itself. The force may be great enough to cause motion of the mover. Thus, it is sometimes desirable to engage a mechanical coupling between the track and the mover to prevent motion during the interaction. These interactions occur repeatedly between successive movers arriving at a station at a known location along the track as part of the assembly process. The mechanical coupling may include, for example, a pin extended from the track and inserted into a channel on the mover. Such mechanical couplings typically provide for some misalignment between a mover and the pin to facilitate insertion. The opening of the channel may be wider and tapered to a narrower diameter at some distance from the opening. The pin will easily fit within the wider opening and draws the mover into alignment as the pin slides into the channel and inserts snugly within the narrower diameter inner channel. Such motion, however, represents a disturbance to the linear drive system for the independent cart system. The linear drive system may generate an increasing amount of current in an attempt to resist motion of the cart resulting from insertion of the pin.

Thus, it would be desirable to provide a system and method to allow external interaction with the mover at known locations along the track without the linear drive system attempting to counteract the external interaction.

BRIEF DESCRIPTION

According to one embodiment of the invention, a method for controlling a mover in an independent cart system is disclosed, where the independent cart system includes at least one track segment and the mover configured to travel along the at least one track segment. The mover is propelled along the track segment with a controller in the track segment, and a signal is generated with the controller responsive to the mover arriving at a station located along the track segment. The controller enters an at-station operating state responsive to the mover arriving at the station and after a first predefined time duration. The mover is propelled along the track segment with the controller after remaining in the at-station operating state for a second predefined time duration.

According to another embodiment of the invention, a system for controlling a mover in an independent cart system includes at least one track segment and at least one mover. The track segment includes multiple drive coils positioned along a length of the track segment and a controller configured to selectively energize the drive coils. The mover includes a drive member, where the drive member is configured to propel the mover along the track segment responsive to the controller selectively energizing the drive coils. The controller is further configured to operate in a first operating state to propel the mover along the track segment. The controller is also configured to generate a signal responsive to the mover arriving at a station along the track segment, operate in an at-station operating state after the mover remains at the station for a first predefined time duration, and resume operation in an operating state other than the at-station operating state to propel the mover along the track segment after the mover remains at the station for a second predefined time duration.

According to still another embodiment of the invention, a non-transitory computer-readable storage medium stores instructions for execution by a processor. When executed, the instructions comprise the steps of propelling a mover along at least one track segment of an independent cart system and generating a signal with a controller in the at least one track segment responsive to the mover arriving at a station located along the at least one track segment. The instructions further comprise the steps of entering an at-station operating state with the controller responsive to the mover arriving at the station and remaining at the station for a first predefined time duration and propelling the mover along the at least one track segment with the controller after remaining in the at-station operating state for a second predefined time duration.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 2 is a sectional view of one embodiment of a mover and track segment included in the linear drive system taken at 2-2 of FIG. 1;

FIG. 3 is a bottom plan view of the exemplary mover of FIG. 2;

FIG. 4 is a partial side cutaway view of the mover and track segment of FIG. 2;

Figure 1:
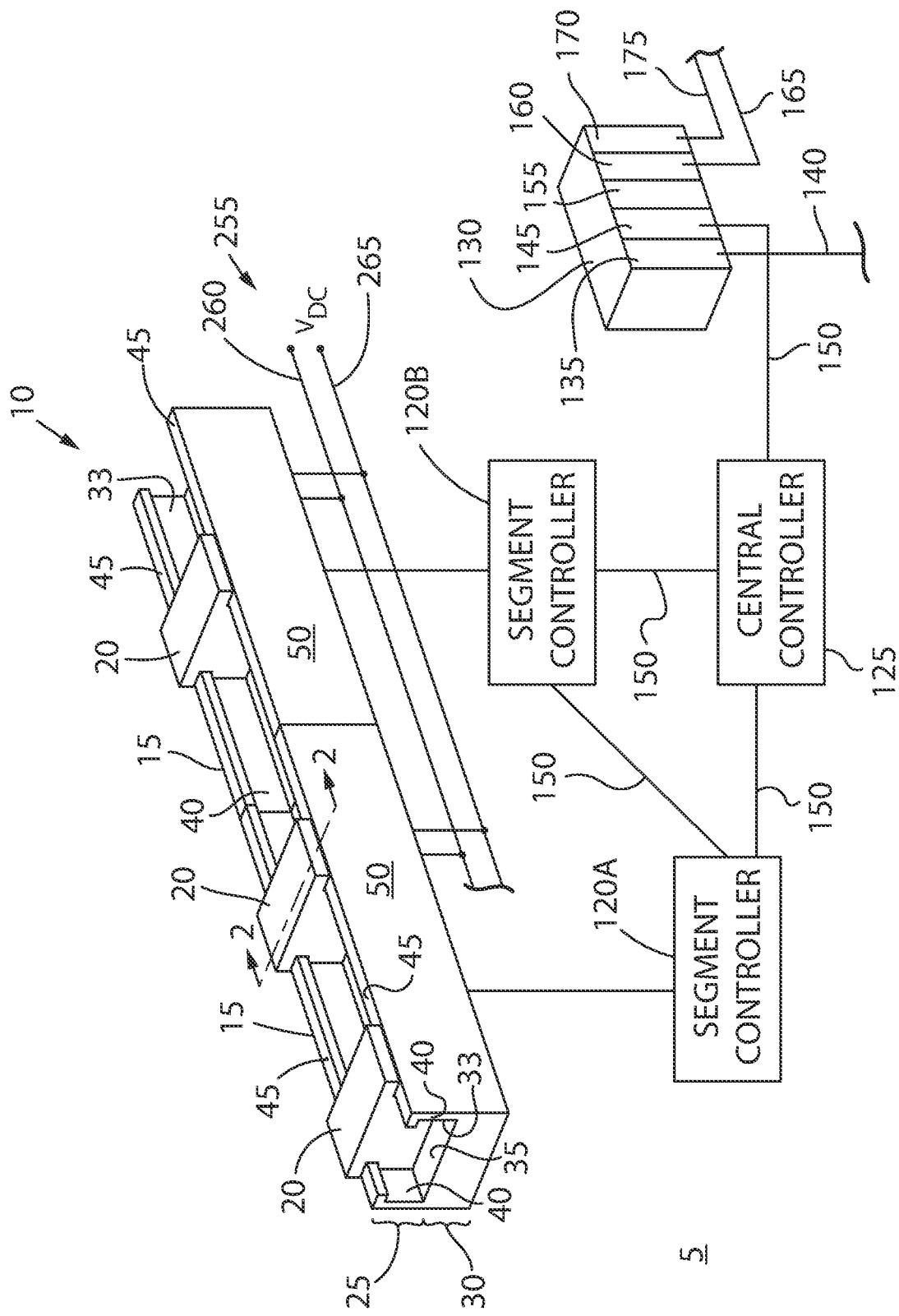
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method to allow external interaction with the mover at known locations along the track without the linear drive system attempting to counteract the external interaction. A linear drive system includes multiple coils spaced along a length of the track. The coils are independently controlled to generate electromagnetic fields. Each mover in the independent cart system includes a passive drive member, such as a permanent magnet or permanent magnet array, mounted to the mover to interact with the electromagnetic fields generated by each coil. Sequential activation of the coils to generate a moving electromagnetic field engages a magnetic field emitted from the permanent magnets to propel each mover along the track. A position feedback system provides information regarding the current position of each mover along the track, and one or more locations at which an external actuator is configured to interact with the mover or with a load mounted on the mover are stored in memory of the controller.

As each mover is propelled along the track, a controller is used to manage motion of the mover along the track as well as an operating state of the track segment on which the mover is located. The controller propels the mover along the track toward a station in a first operating state and has knowledge of a desired location along the track, also referred to herein as a station, at which the mover is to be positioned for interaction by the external actuator. The controller receives the feedback information corresponding to the present location of the mover and brings the mover to a stop (or other commanded operation) at the station. When the mover is within a predefined tolerance of the location of the station and/or below a predefined speed, the controller generates a signal to alert the external actuator of the presence of a mover at the station. After waiting for a first predefined time interval, the controller switches from the first operating state to a second operating state. In the second operating state, the coils may be de-energized or the controller may be reconfigured to operate in a less responsive manner such that the controller does not correct position disturbances as rapidly and/or as forcefully as in the first operating state. The controller remains in the second operating state for a second predefined interval, during which the external actuator interacts with the mover or a load on the mover. After the second predefined interval, the controller enters a third operating state. The third operating state may be identical to the first operating state or may be yet a different operating state than the first or second operating states. In the third operating state, the controller reenergizes the coils proximate the mover and propels the mover along the track and away from the station.

Turning initially to FIGS. 1-4, an exemplary independent cart system 5 (or simply "system 5") for moving articles or products includes a track 10 made up of multiple segments 15. According to the illustrated system 5, two segments 15 are joined end-to-end to define the illustrated track configuration. The illustrated segments 15 are both straight segments having generally the same length. It is understood that track segments of various sizes, lengths, and shapes may be connected together to form the track 10 without deviating from the scope of the invention. Track segments 15 may be joined to form a generally closed loop supporting a set of movers 20 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 20 will travel along the track and take various orientations according to the configuration of the track 10 and the relationships discussed herein may vary accordingly.

According to the illustrated system 5, each track segment 15 includes an upper portion 25 and a lower portion 30. The upper portion 25 is configured to carry the movers 20 and the lower portion 30 is configured to house the control elements. As illustrated, the upper portion 25 includes a generally u-shaped channel 33 extending longitudinally along the upper portion 25 of each segment. The channel 33 includes a bottom surface 35 and a pair of side walls 40, where each side wall 40 includes a rail 45 extending along an upper edge of the side wall 40. The bottom surface 35, side walls 40, and rails 45 extend longitudinally along the track segment 15 and define a guideway along which the movers 20 travel. According to one embodiment, the surfaces of the channel 33 (i.e., the bottom surface 35, side walls 40 and rails 45) are planar surfaces made of a low friction material along which movers 20 may slide. The contacting surfaces of the movers 20 may also be planar and made of a low friction material. It is contemplated that the surface may be, for example, nylon, Teflon®, aluminum, stainless steel and the like. Optionally, the hardness of the surfaces on the track segment 15 are greater than the contacting surface of the movers 20 such that the contacting surfaces of the movers 20 wear faster than the surface of the track segment 15. It is further contemplated that the contacting surfaces of the movers 20 may be removably mounted to the housing of the mover 20 such that they may be replaced if the wear exceeds a predefined amount. According to still other embodiments, the movers 20 may include low-friction rollers to engage the surfaces of the track segment 15. Optionally, the surfaces of the channel 33 may include different cross-sectional forms with the mover 20 including complementary sectional forms. Various other combinations of shapes and construction of the track segment 15 and mover 20 may be utilized without deviating from the scope of the invention.

According to the illustrated system 5, each mover 20 is configured to slide along the channel 33 as it is propelled by a linear drive system. The mover 20 includes a body 55 configured to fit within the channel 33. The body 55 includes a lower surface 60, configured to engage the bottom surface 35 of the channel 33, and side surfaces 65 configured to engage the side walls 40 of the channel 33. The mover 20 further includes a shoulder 70 extending inward from each of the side surfaces 65. The shoulder 70 has a width equal to or greater than the width of the rail 45 protruding into the channel 33. A neck of the mover then extends upward to a top surface 75 of the body 55. The neck extends for the thickness of the rails such that the top surface 75 of the body 55 is generally parallel with the upper surface of each rail 45. The mover 20 further includes a platform 80 secured to the top surface 75 of the body 55. According to the illustrated embodiment, the platform 80 is generally square and the width of the platform 80 is greater than the width between the rails 45. The lower surface of the platform 80, an outer surface of the neck, and an upper surface of the shoulder 70 define a channel 85 in which the rail 45 runs. The channel 85 serves as a guide to direct the mover 20 along the track. It is contemplated that platforms or attachments of various shapes may be secured to the top surface 75 of the body 55. Further, various workpieces, clips, fixtures, and the like may be mounted on the top of each platform 80 for engagement with a product to be carried along the track by the mover 20. The platform 80 and any workpiece, clip, fixture, or other attachment present on the platform may define, at least in part, a load present on the mover 20.

Figure 7:
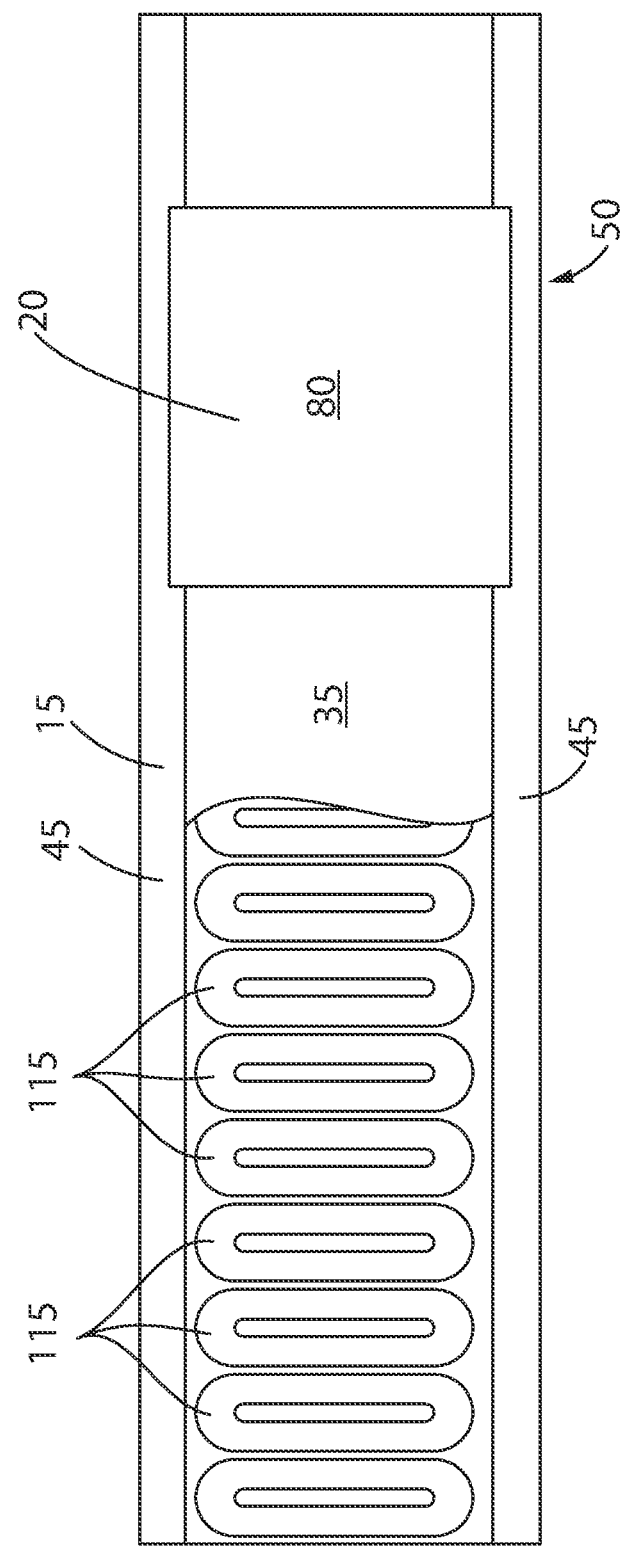
FIG. 7 is a partial top cutaway view of the mover and track segment of FIG. 2.

The mover 20 is carried along the track 10 by a linear drive system 90 (FIG. 2). The linear drive system is incorporated in part on each mover 20 and in part within each track segment 15. With reference also to FIG. 7, drive coils 115 are positioned along the length of each track segment, and one or more drive members 100 are mounted to each mover 20. It is contemplated that the drive members may be drive magnets 118, steel back iron and teeth, conductors, or any other suitable member that will interact with the electromagnetic fields generated by the coils 115 to propel each mover 20 along the track 10. For convenience, each drive member 100 will be discussed herein as a drive magnet 118. Alternately, it is contemplated that drive members 100 may be mounted along the length of each track segment and one or more drive coils 115 may be mounted to each mover 20 with the associated controllers to regulate current flow in each drive coil also mounted to each mover.

With reference to FIG. 3, the drive magnets 118 are arranged in a block on the lower surface of each mover. The drive magnets 118 include positive magnet segments 105, having a north pole, N, facing outward from the mover and negative magnet segments 110, having a south pole, S, facing outward from the mover. According to the illustrated system 5, two positive magnet segments 105 are located on the outer sides of the set of magnets and two negative magnet segments 110 are located between the two positive magnet segments 105. Optionally, the positive and negative motor segments may be placed in an alternating configuration. In still other constructions, a single negative magnet segment 110 may be located between the positive magnet segments 105. According to still another embodiment, the drive magnets 118 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 118 may be utilized without deviating from the scope of the invention.

Figure 5:
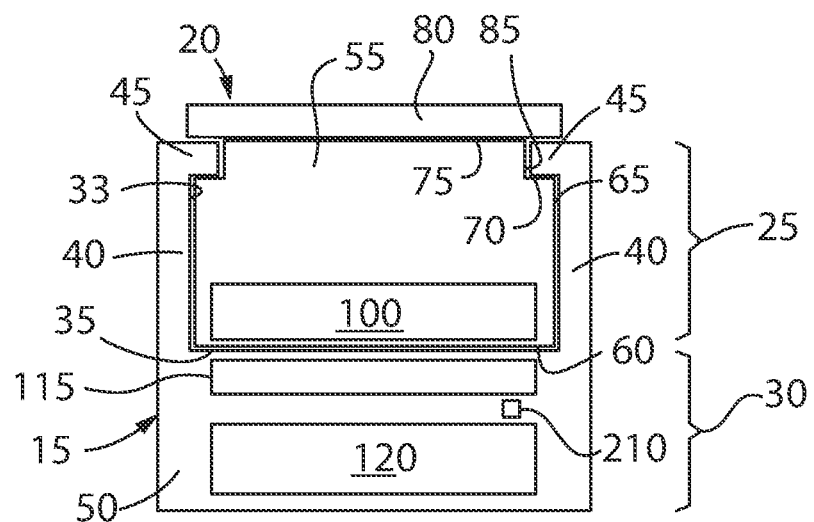
FIG. 5 is a sectional view of another embodiment of a mover and track segment included in the linear drive system taken at 2-2 of FIG. 1.

The linear drive system 90 further includes a series of coils 115 spaced along the length of the track segment 15. With reference also to FIGS. 5 and 7, the coils 115 may be positioned within the housing 50 for the track segment 15 and below the bottom surface 35 of the channel 33. The coils 115 are energized sequentially according to the configuration of the drive magnets 118 present on the movers 20. The sequential energization of the coils 115 generates a moving electromagnetic field that interacts with the magnetic field of the drive magnets 118 to propel each mover 20 along the track segment 15.

A segment controller 120 is provided with each track segment 15 to control the linear drive system and to achieve the desired motion of each mover 20 along the track segment 15. Although illustrated in FIG. 1 as blocks external to the track segments 15, the arrangement is to facilitate illustration of interconnects between controllers. As shown in FIG. 2, it is contemplated that each segment controller 120 may be mounted in the lower portion 30 of the track segment 15. Each segment controller 120 is in communication with a central controller 125 which is, in turn, in communication with an industrial controller 130. The industrial controller 130 may be, for example, a programmable logic controller (PLC) configured to control elements of a process line stationed along the track 10. The process line may be configured, for example, to fill and label boxes, bottles, or other containers loaded onto or held by the movers 20 as they travel along the line. In other implementations, robotic assembly stations may perform various assembly and/or machining tasks on workpieces carried along by the movers 20. The exemplary industrial controller 130 includes: a power supply 135 with a power cable 140 connected, for example, to a utility power supply; a communication module 145 connected by a network medium 150 to the central controller 125; a processor module 155; an input module 160 receiving input signals 165 from sensors or other devices along the process line; and an output module 170 transmitting control signals 175 to controlled devices, actuators, and the like along the process line. The processor module 155 may identify when a mover 20 is required at a particular location and may monitor sensors, such as proximity sensors, position switches, or the like to verify that the mover 20 is at a desired location. The processor module 155 transmits the desired locations of each mover 20 to a central controller 125 where the central controller 125 operates to generate commands for each segment controller 120.

Figure 8:
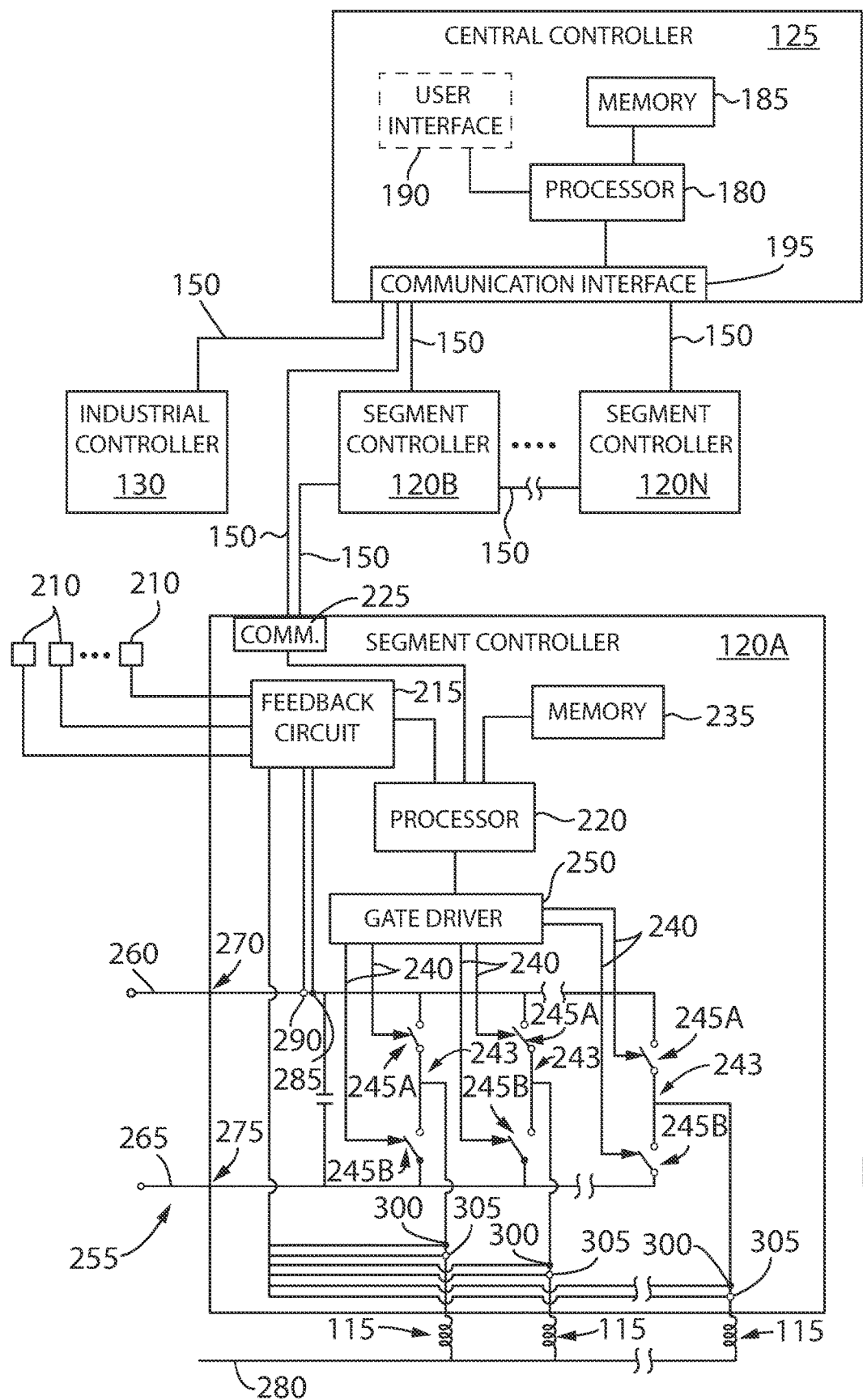
FIG. 8 is a block diagram representation of one embodiment of the exemplary control system of FIG. 1.

With reference also to FIG. 8, the central controller 125 includes a processor 180 and a memory 185. It is contemplated that the processor 180 and memory 185 may each be a single electronic device or formed from multiple devices. The processor 180 may be a microprocessor. Optionally, the processor 180 and/or the memory 185 may be integrated on a field programmable gate array (FPGA) or an application specific integrated circuit (ASIC). The memory 185 may include volatile memory, non-volatile memory, or a combination thereof. An optional user interface 190 may be provided for an operator to configure the central controller 125 and to load or configure desired motion profiles for the movers 20 on the central controller 125. Optionally, the configuration may be performed via a remote device connected via a network and a communication interface 195 to the central controller 125. It is contemplated that the central controller 125 and user interface 190 may be a single device, such as a laptop, notebook, tablet or other mobile computing device. Optionally, the user interface 190 may include one or more separate devices such as a keyboard, mouse, display, touchscreen, interface port, removable storage medium or medium reader and the like for receiving information from and displaying information to a user. Optionally, the central controller 125 and user interface may be an industrial computer mounted within a control cabinet and configured to withstand harsh operating environments. It is contemplated that still other combinations of computing devices and peripherals as would be understood in the art may be utilized or incorporated into the central controller 125 and user interface 190 without deviating from the scope of the invention.

In one aspect of the invention, the central controller 125 may be configured to operate in a configuration referred to as "centralized control". The central controller 125 includes one or more programs stored in the memory 185 for execution by the processor 180. The central controller 125 receives a desired position from the industrial controller 130 and determines one or more motion profiles for each of the movers 20 to follow along the track 10. A program executing on the processor 180 is in communication with each segment controller 120 on each track segment via the network medium 150. The central controller 125 may transfer a desired motion profile to each segment controller 120.

In another aspect of the invention, the central controller 125 may be configured to operate in a configuration referred to as "distributed control". The central controller 125 may be configured to transfer the information from the industrial controller 130 identifying one or more desired movers 20 to be positioned at or moved along the track segment 15, and each segment controller 120 may determine the appropriate motion profile for a mover 20 present on the corresponding segment controller. It is contemplated that a separate central controller 125 may not be required in distributed control and, rather, the functions otherwise performed by the central controller 125 for communication between the industrial controller 130 and each segment controller 120 may be incorporated into the industrial controller 130.

A position feedback system provides knowledge of the location of each mover 20 along the length of the track segment 15 to the segment controller 120. According to the system 5 illustrated in FIGS. 2 and 4, the position feedback system includes one or more position magnets 205 mounted to the mover 20 and an array of sensors 210 spaced along the side wall 40 of the track segment 15. The sensors 210 are positioned such that each of the position magnets 205 is proximate to the sensor as the mover 20 passes each sensor 210. The sensors 210 are a suitable magnetic field detector including, for example, a Hall-Effect sensor, a magnetodiode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 210 outputs a feedback signal provided to the segment controller 120 for the corresponding track segment 15 on which the sensor 210 is mounted. The feedback signal may be an analog signal provided to a feedback circuit 215 which, in turn, provides a signal to the processor 220 corresponding to the magnet 205 passing the sensor 210.

Figure 6:
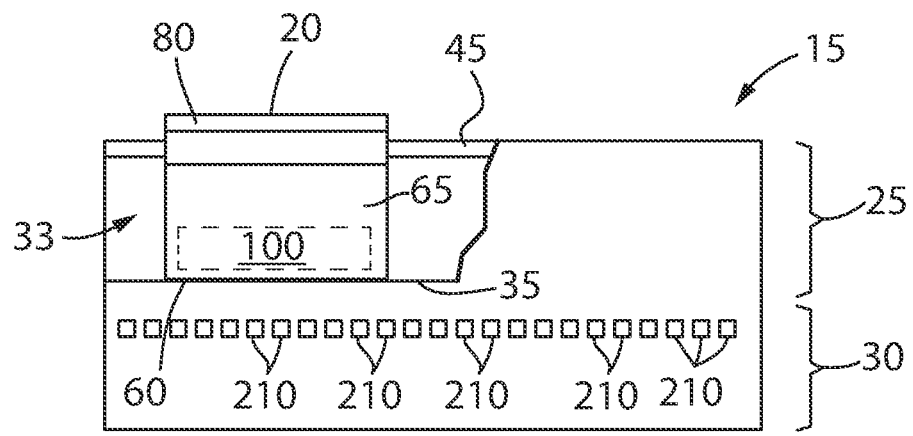
FIG. 6 is a partial side cutaway view of the mover and track segment of FIG. 5.

According to another arrangement, illustrated in FIGS. 5 and 6, the position feedback system utilizes the drive magnets 100 as position magnets. Position sensors 210 are positioned along the track segment 15 at a location suitable to detect the magnetic field generated by the drive magnets 118. According to the illustrated embodiment, the position sensors 210 are located below the coils 115. Optionally, the position sensors 210 may be interspersed with the coils 115 and located, for example, in the center of a coil or between adjacent coils. According to still another embodiment, the position sensors 210 may be positioned within the upper portion 25 of the track segment 15 and near the bottom surface 35 of the channel 33 to be aligned with the drive magnets 118 as each mover 20 travels along the tracks segment 15.

Referring again to FIG. 8, the segment controller 120 also includes a communication interface 225 that receives communications from the central controller 125 and/or from adjacent segment controllers 120. The communication interface 225 extracts data from the message packets on the industrial network and passes the data to a processor 220 executing in the segment controller 120. The processor may be a microprocessor. Optionally, the processor 220 and/or a memory 235 within the segment controller 120 may be integrated on a field programmable gate array (FPGA) or an application specific integrated circuit (ASIC). It is contemplated that the processor 220 and memory 235 may each be a single electronic device or formed from multiple devices. The memory 235 may include volatile memory, non-volatile memory, or a combination thereof. At least a portion of the memory 235 is a non-transitory computer-readable storage medium. The non-transitory computer-readable storage medium is configured to store instructions for execution by the processor 232. The segment controller 120 receives the motion profile or desired motion of the movers 20 and utilizes the motion commands to control movers 20 along the track segment 15 controlled by that segment controller 120.

Each segment controller 120 generates switching signals to generate a desired current and/or voltage at each coil 115 in the track segment 15 to achieve the desired motion of the movers 20. The switching signals 240 control operation of switching devices 245 for the segment controller 120. According to the illustrated system 5, the segment controller 120 includes a dedicated gate driver module 250 which receives command signals from the processor 220, such as a desired voltage and/or current to be generated in each coil 115, and generates the switching signals 240. Optionally, the processor 220 may incorporate the functions of the gate driver module 250 and directly generate the switching signals 240. The switching devices 245 may be a solid-state device that is activated by the switching signal, including, but not limited to, transistors, thyristors, or silicon-controlled rectifiers.

According to the illustrated system 5, the track 10 receives power from a distributed DC voltage. A DC bus 255 receives a DC voltage, VDC, from a DC supply and conducts the DC voltage to each track segment 15. The illustrated DC bus 255 includes two voltage rails 260, 265 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 15, it is contemplated that the DC bus 255 may extend within the lower portion 30 of the track segment. Each track segment 15 includes connectors to which either the DC supply or another track segment may be connected such that the DC bus 255 may extend for the length of the track 10. Optionally, each track segment 15 may be configured to include a rectifier section (not shown) and receive an AC voltage input. The rectifier section in each track segment 15 may convert the AC voltage to a DC voltage utilized by the corresponding track segment.

The DC voltage from the DC bus 255 is provided at the input terminals 270, 275 to a power section for the segment controller. A first voltage potential is present at the first input terminal 270 and a second voltage potential is present at the second input terminal 275. The DC bus 255 extends into the power section defining a positive rail 260 and a negative rail 265 within the segment controller 120. The terms positive and negative are used for reference herein and are not meant to be limiting. It is contemplated that the polarity of the DC voltage present between the input terminals 270, 275 may be negative, such that the potential on the negative rail 265 is greater than the potential on the positive rail 260. Each of the voltage rails 260, 265 are configured to conduct a DC voltage having a desired potential, according to application requirements. According to one arrangement, the positive rail 260 may have a DC voltage at a positive potential and the negative rail 265 may have a DC voltage at ground potential. Optionally, the positive rail 260 may have a DC voltage at ground potential and the negative rail 265 may have a DC voltage at a negative potential. According to still another arrangement, the positive rail 260 may have a first DC voltage at a positive potential with respect to the ground potential and the negative rail 265 may have a second DC voltage at a negative potential with respect to the ground potential. The resulting DC voltage potential between the two rails 260, 265 is the difference between the potential present on the positive rail 260 and the negative rail 265.

It is further contemplated that the DC supply may include a third voltage rail having a third voltage potential. According to one implementation, the positive rail 260 has a positive voltage potential with respect to ground, the negative rail 265 has a negative voltage potential with respect to ground, and the third voltage rail is maintained at a ground potential. Optionally, the negative voltage rail 265 may be at a ground potential, the positive voltage rail 260 may be at a first positive voltage potential with respect to ground, and the third voltage rail may be at a second positive voltage potential with respect to ground, where the second positive voltage potential is approximately one half the magnitude of the first positive voltage potential. With such a split voltage DC bus, two of the switching devices 245 may be used in pairs to control operation of one coil 115 by alternately provide positive or negative voltages to one the coils 115.

The power section in each segment controller 120 may include multiple legs, where each leg is connected in parallel between the positive rail 260 and the negative rail 265. According to the system illustrated in FIG. 8, three legs are shown arranged in a half-bridge configuration. However, the number of legs may vary and will correspond to the number of coils 115 extending along the track segment 15. Each leg includes a first switching device 245a and a second switching device 245b connected in series between the positive rail 260 and the negative rail 265 with a common connection 243 between the first and second switching devices 245a, 245b. The first switching device 245a in each leg 221 may also be referred to herein as an upper switch, and the second switching device 245b in each leg 221 may also be referred to herein as a lower switch. The terms upper and lower are relational only with respect to the schematic representation and are not intended to denote any particular physical relationship between the first and second switching devices 245a, 245b. The switching devices 245 include, for example, power semiconductor devices such as transistors, thyristors, and silicon-controlled rectifiers, which receive the switching signals 240 to turn on and/or off. Each of switching devices may further include a diode connected in a reverse parallel manner between the common connection 243 and either the positive or negative rail 260, 265.

Figure 9:
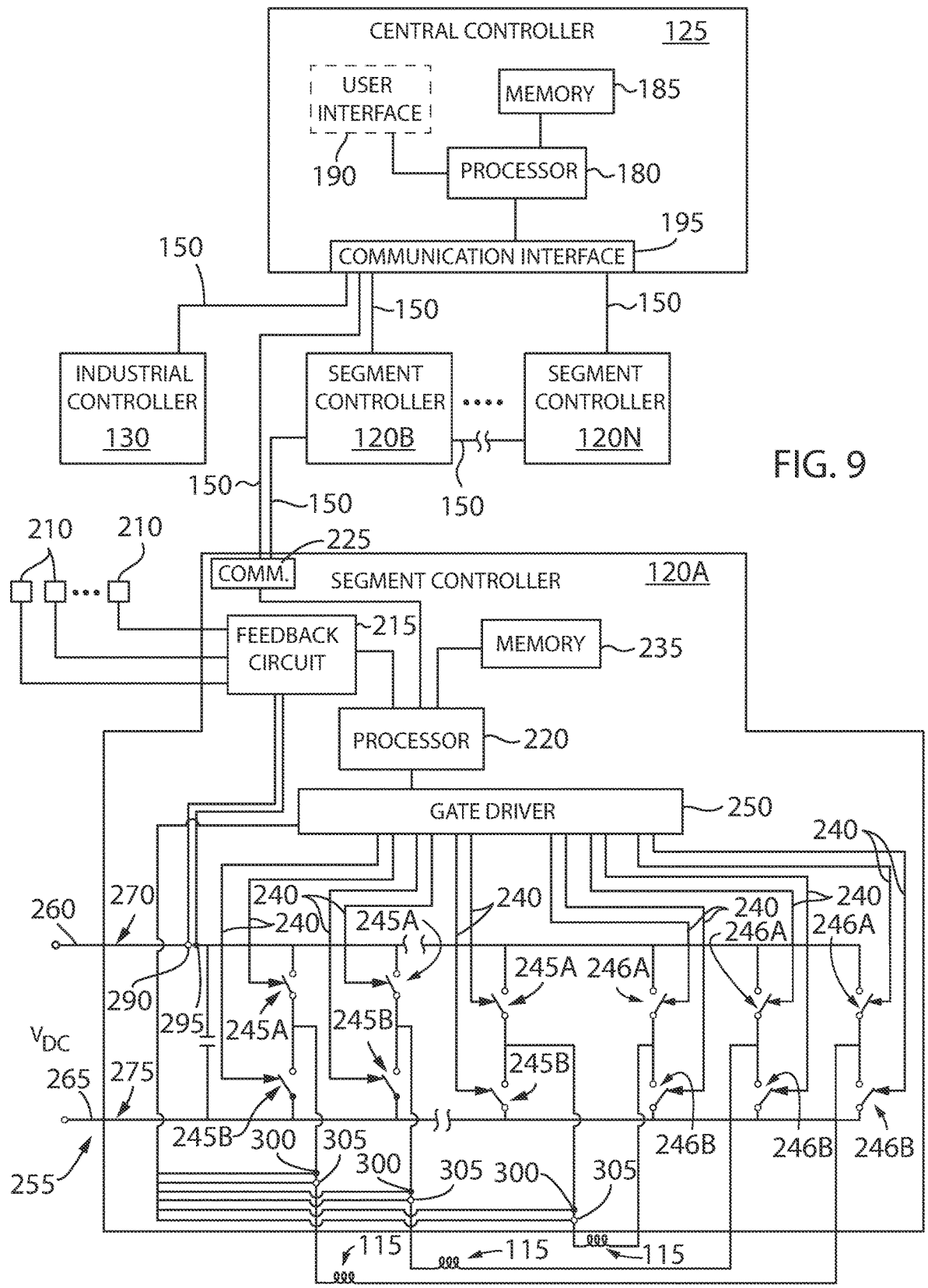
FIG. 9 is a block diagram representation of another embodiment of the exemplary control system of FIG. 1.

According to the embodiment illustrated in FIG. 9, three legs are shown arranged in a full-bridge configuration. Again, the number of legs may vary and will correspond to the number of coils 115 extending along the track segment 15. Each leg includes a first switching device 245a and a second switching device 245b connected in series on one side of the coil 115. The first and second switching devices 245a, 245b are connected between the positive rail 260 and the negative rail 265 with a first common connection between the first and second switching devices 245a, 245b. The first common connection is connected to the first side of the coil 115. Each leg further includes a third switching device 246a and a fourth switching device 246b connected in series on the other side of the coil 115. The third and fourth switching devices 246a, 246b are connected between the positive rail 260 and the negative rail 265 with a second common connection between the third and fourth switching devices 246a, 246b. The second common connection is connected to the second side of the coil 115. The first and third switching devices 245a, 246a in each leg may also be referred to herein as upper switches, and the second and fourth switching devices 245b, 246b in each leg may also be referred to herein as lower switches. The terms upper and lower are relational only with respect to the schematic representation and are not intended to denote any particular physical relationship between the switching devices. The switching devices 245, 246 include, for example, power semiconductor devices such as transistors, thyristors, and silicon-controlled rectifiers, which receive the switching signals 240 to turn on and/or off. Each of switching devices 245, 246 may further include a diode connected in a reverse parallel manner between the first or second common connection and either the positive or negative rail 260, 265.

With reference again to FIG. 8, the processor 220 also receives feedback signals from sensors providing an indication of the operating conditions within the power segment or of the operating conditions of a coil 115 connected to the power segment. According to the illustrated system 5, the power segment includes a voltage sensor 285 and a current sensor 290 at the input of the power segment. The voltage sensor 285 generates a voltage feedback signal and the current sensor 290 generates a current feedback signal, where each feedback signal corresponds to the operating conditions on the positive rail 260. The segment controller 120 also receives feedback signals corresponding to the operation of coils 115 connected to the power segment. A voltage sensor 300 and a current sensor 305 are connected in series with the coils 115 at each output of the power section. The voltage sensor 300 generates a voltage feedback signal and the current sensor 305 generates a current feedback signal, where each feedback signal corresponds to the operating condition of the corresponding coil 115. The processor 220 executes a program, consisting of a series of instructions, stored on the non-transitory memory device 235 to regulate the current and/or voltage supplied to each coil and the processor 220 and/or gate driver module 250 generates switching signals 240 which selectively enable/disable each of the switching devices 245 to achieve the desired current and/or voltage in each coil 115. With reference also to FIG. 9, it is contemplated that the feedback signals from the current sensor 305 and/or the voltage sensor 300 corresponding to the operation of the coils 115 may be provided to a dedicated current regulator device. As shown in FIG. 9, the feedback signals are provided directly to the gate driver 250 which would, in turn, regulate the current output to each coil and generate the switching signals 240 accordingly. The energized coils 115 create an electromagnetic field that interacts with the drive magnets 118 on each mover 20 to control motion of the movers 20 along the track segment 15.

In operation, a controller for the independent cart system 10 executes instructions to select different operating modes of a track segment 15 and/or a mover 20 present on the track segment 15 as the mover 20 passes a station 400 (see FIG. 10) located along a length of the track segment. The instructions are stored in a non-transitory computer-readable medium, which makes up at least a portion of the memory 235 of the segment controller 120. With reference also to FIG. 1, the controller may include instructions executed in a segment controller 120, a central controller 125, an industrial controller 130, or a combination thereof. For purposes of illustration, one embodiment of the invention will be discussed with the instructions stored within the segment controller 120.

Figure 10:
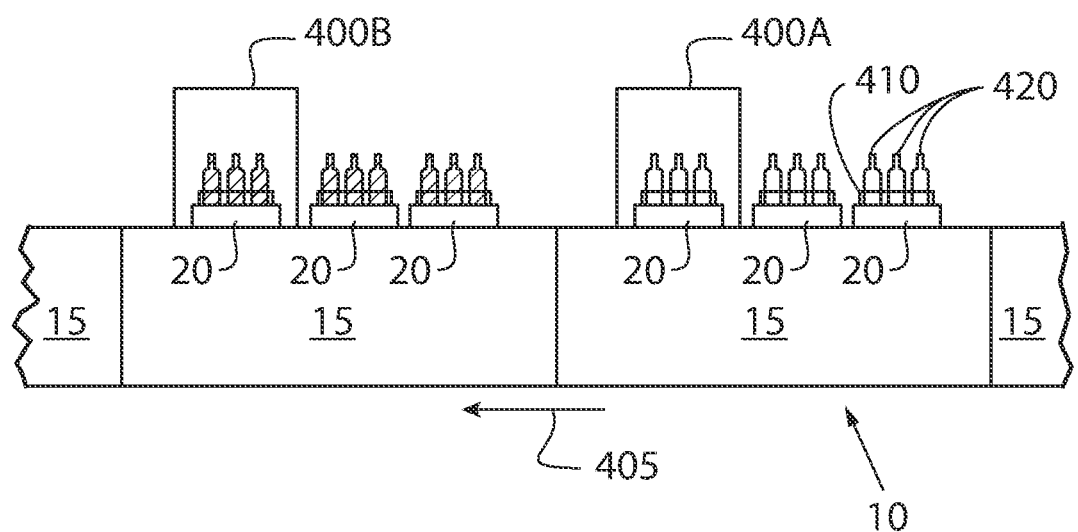
FIG. 10 is a side elevation view of multiple movers present on a section of track with multiple stations positioned adjacent to the track.

Turning to FIG. 10, multiple movers 20 are traveling along a track 10 in a first direction 405 past a first station 400A and a second station 400B. According to the illustrated example, each mover 20 includes a fixture 410 mounted on the platform of the mover. The fixture 410 is configured to hold multiple containers 420, such as bottles. The first station 400A is configured to fill each bottle. The second station 400B is configured to affix a label to each bottle. Although illustrated with three bottles, the illustration is not intended to be limiting. Any number of bottles, or other types of containers 420, may be positioned on the mover 20. It is contemplated that two rows of bottles may be positioned on each mover 20. Additional stations 400 may be provided that, for example, affix a cap on each bottle or that place the bottles into a carrier or other packaging. In other applications, different fixtures 410, containers 420, or product may be included on a mover 20 and each station 400 may be configured to perform different operations according to the type of fixture, container, product, or the like passing each station 400.

The segment controller 120 receives a command for each mover 20 present on the corresponding track segment. The segment controller 120 receives position information from the position sensors 210 spaced along the track segment 15 for each mover 20 present on the track segment. The segment controller sequentially energizes coils 115 to interact with the drive magnets 100 present on each mover 20 and to propel each mover 20 along the track segment. The segment controller 120 coordinates motion of each mover 20 on the track segment to avoid collisions between multiple movers present on the track segment and to propel the mover to a desired location.

Figure 11:
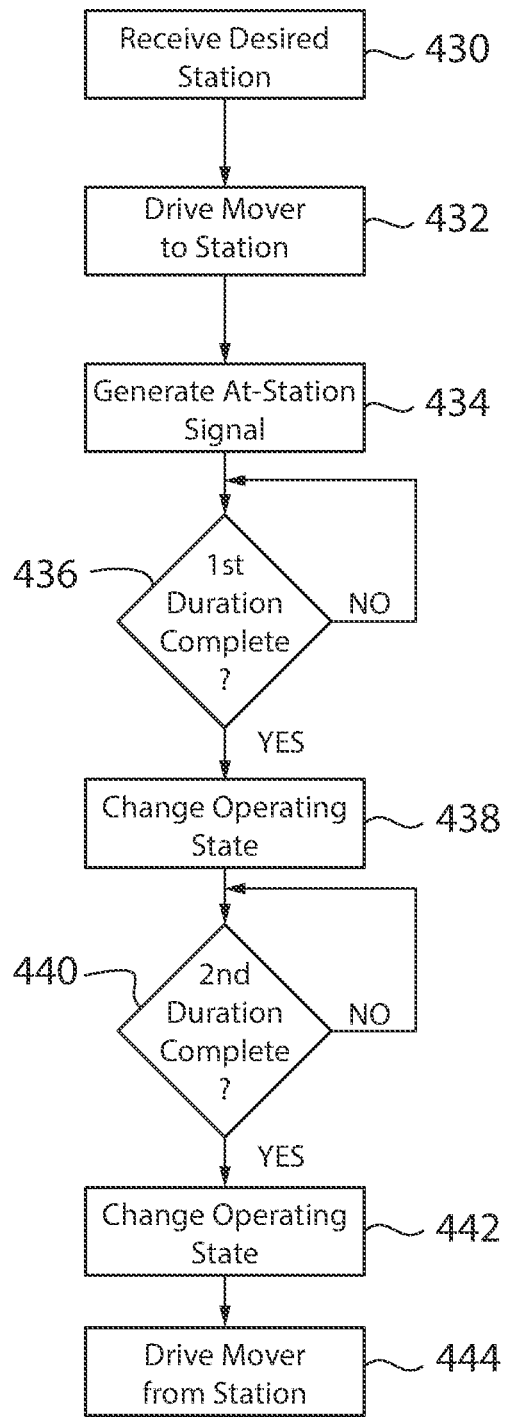
FIG. 11 is a flow diagram for controlling operation of a mover at a station according to one embodiment of the invention.

The command for one of the movers 20 may be, for example, a command to travel to a station 400 located adjacent to the track segment 15 in which the segment controller 120 is located. With reference also to FIG. 11, this station command is received at step 430. The segment controller 120 is configured to operate in a first operating state to sequentially energize the coils 115 and drive the mover 20 to the desired station 400, as shown in step 432. During the first operating state, the segment controller 120 may utilize a first set of controller gains for internal control loops executing on the processor 220. The internal control loops may be proportional loops, integral loops, derivative loops, or a combination thereof. The control loops may operate at a first bandwidth on position, velocity, acceleration, or torque feedback and command signals, or a combination thereof. The output of the control loops executing at the first bandwidth provide a current command signal to a current regulator executing within the processor 220, gate driver 250, or a combination thereof. The current regulator controls the current within the coils 115 to achieve desired motion of the movers 20.

Once the mover 20 has arrived at a station 400, the segment controller 120 generates an at-station signal, as shown in step 434. It is contemplated that the segment controller 120 may use one or more criterion for setting the at-station signal. According to a first aspect of the invention, the location of each station 400 may be stored in memory 235 of the segment controller 120. The segment controller 120 compares the present location of the commanded mover 20, obtained from the position feedback system, to the location of the station 400. When the present location of the mover 20 is within a predefined distance of the location of the station 400, the segment controller 120 may set the at-station signal. According to another aspect of the invention, the segment controller 120 monitors the velocity at which the mover 20 is travelling. The velocity may be determined as a function of the change in position of the mover 20 over time or as a velocity reference signal determined within the control loops executing on the processor 220. When the velocity of the mover 20 is below a predefined threshold, the segment controller 120 may set the at-station signal. According to still another aspect of the invention, the segment controller 120 may monitor both the present location and the velocity of the mover 20, requiring the mover 20 to be within a predefined distance from the location of the station 400 and below a predefined velocity in order to set the at-station signal.

After generating the at-station signal, the segment controller 120 waits at the station 400 for a first predefined duration. During this first duration, the segment controller 120 continues to control operation of the mover 20 in the same operating state as when it was driving the mover 20 to the station 400. In the first operating state, a first set of controller gains is selected for use by the internal control loops executing on the processor. The first set of controller gains may be configured to have a high bandwidth and/or to operate in a servo positioning mode, such that the segment controller 120 is able to control the mover 20 to stay at a desired position along the track 10. In this first operating state, the segment controller 120 will generate gating signals 240 to control operation of the coils 115 according to the output of the control loops with the first set of controller gains. During this first predefined duration, the industrial controller 130 or another external controller may be configured, for example, to extend a pin from the track segment 15 into a mating receptacle on the mover 20 to mechanically lock the mover 20 in position. The industrial controller 130 may also command one or more external actuators in the station 400 to begin operating on the mover 20 or on the product located on the mover.

Moving next to step 438, when the first predefined duration is complete, the segment controller 120 transitions to a second operating state, also referred to as an at-station operating state. During this second operating state, the segment controller 120 may disable one or more coils 115 located adjacent to the mover 20. The disabled coils 115, if energized, would create an electromagnetic field that would interact with the drive magnets 100 mounted on the mover 20. Disabling the coils 115 proximate the mover at the station 400 ensures that the mover 20 is not actuated by the linear drive system while the external actuator(s) are interacting with the mover 20 or with a product mounted on the mover. At the same time, any coils not proximate the mover 20 locate at the station 400 may be controlled to drive another mover 20 either toward or away from the station 400 located along the track segment 15. Thus, the segment controller 120 may continue operation to prepare the next mover 20 for entry into the station 400 or propel the mover 20 previously located at the station 400 away from the station and onward along the track 10 while another mover 20 is located at the station 400.

According to another aspect of the invention, the second operating state may include a second set of controller gains. The different sets of controller gains are stored in memory 235 of the segment controller 120. The processor reads values for the second set of controller gains and utilizes the second set of controller gains for the internal control loops. The second set of controller gains may be configured to have a lower bandwidth and be less responsive than the first set of controller gains. It is contemplated that the second set of controller gains may disable an integral controller to prevent wind-up of the integrator during operation in the second operating state. This second operating state may also be referred to as a "spring" control for the mover 20. Rather than inserting a pin into the mover 20, the track segment 15 may include a positioning pin which raises up after a prior mover 20 leaves the station 400 and before the next mover 20 arrives at the station. The segment controller 120 may position the mover 20 adjacent the position pin in the first operating state, and then propel the mover 20 toward the positioning pin in the second operating state. The spring control is used to apply a limited biasing force by the coils 115 toward the positioning pin without causing the control loops to ramp up the force, as may be done during servo control, such that the mover 20 is held against the positioning pin in a known location.

Similarly, the segment controller 120 may operate in the second operating state without the presence of a position pin. The segment controller 120 receives a position command and operates in the spring control mode to provide some resistance to motion as a result of external disturbances without providing the rapid response of servo control which may be present in the first operating state. This second operating state keeps the coils 115 energized, but provides a reduced response rate to external disturbances observed by the mover 20.

According to still another aspect of the invention, the segment controller 120 may be configured to allow motion during the second operating state. An external actuator, such as a robotic arm, present at the station 400 may engage the mover 20 or a product on the mover during the second operating state. The station 400 may extend for a distance along the track segment 15 and the external actuator may cause the mover 20 to travel along the track as another actuator interacts with the mover 20 or product located on the mover. The second set of operating gains may be configured to allow this motion caused by an external actuator. The segment controller 120 receives position feedback information for the mover 20 even as it is driven by the external actuator. According to one embodiment of the invention, the segment controller 120 generates a new position command for the mover 20 that tracks the position feedback signal, allowing the control loops to provide a soft response to other external disturbances while tracking the motion caused by the external actuator. According to another embodiment of the invention, the segment controller 120 may disable coils 115 sequentially as the mover 20 is pushed by the external actuator along the track segment, such that the control loops for the segment controller 120 do not interfere with the external actuator.

Turning next to steps 440 and 442 in FIG. 11, the segment controller 120 remains in the second operating state for a second duration. When the second duration is complete, the segment controller 120 transitions to a third operating state. According to one aspect of the invention, the first and third operating states may be identical. Thus, the segment controller 120 includes a first set of gains for operation while propelling a mover 20 to or away from the station 400, and the segment controller 120 includes a second set of gains and/or disables operation of coils 115 while the mover 20 is located at a station 400. The segment controller 120 transitions from one operating state to the second operating state after being located at the station for the first duration and transitions back to the first operating state after being at the station 400 and in the second operating state for the second duration.

According to another aspect of the invention, the first and third operating states may be different. It is contemplated, for example, that the container 420 may be filled at the station 400A illustrated in FIG. 10. The characteristics of the mover 20 and load may require a different operating state leaving the first station 400A than entering the station. For example, the weight of the product may limit the speed at which the mover 20 may travel. Optionally, the type of product, such as a liquid, may require slower acceleration and deceleration to avoid spillage after the container 410 is full than when the container is empty. The memory 235 of the segment controller 120 may store a third set of controller gains and/or operating parameters that define operation in the third operating state. The processor 220 reads the third set of gains and parameters and controls operation of the mover 20 as it is driven away from the station 400 according to the third operating state, as shown in step 444.

It is still another aspect of the present invention, that the segment controller 120 is configured to control the mover 20 in both directions along the track segment 15. With reference again to FIG. 10, the movers 20 are illustrated moving in a first direction 405 along the track 10. In one configuration of the track 10, a return path may be connected between the left end of the track 10 and the right end of the track, defining a generally closed loop around which the movers 20 travel. In such an application, the movers 20 continually travel in the first direction 405 around the loop. In another configuration of the track 10, movers 20 may travel along the track 10 in the first direction 405 to engage with each station 400 positioned along the track 10, but then return in a second direction, the second direction being opposite the first direction 405, past the stations 400. The movers 20 may, for example, be held at a queuing location at the left end of the track until each mover 20 has passed the stations 400. Once each mover 20 has passed the stations 400 and the product is unloaded from the movers 20, the movers 20 may return along the same length of track 10 to a starting position. At the starting position or at a designated loading station 400, new product is loaded onto each mover 20 and the movers 20 again travel past each station 400. It is contemplated that the segment controller 120 is configured to transition between each operating mode and interact with each station 400 only in the first direction 405 of travel. In the second direction of travel, the movers 20 may return past each station 400 without interacting with the stations.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for controlling a mover in an independent cart system, wherein the independent cart system includes at least one track segment and the mover configured to travel along the at least one track segment, the method comprising the steps of:
    propelling the mover along the at least one track segment with a controller in the at least one track segment using a first set of controller gains;
    generating a signal with the controller responsive to the mover arriving at a station located along the at least one track segment;
    reading an alternate set of controller gains from a non-transitory memory in the controller, wherein the alternate set of controller gains is different than the first set of controller gains;
    using the alternate set of controller gains to control operation of the mover at the station at a first predefined time duration after generating the signal responsive to the mover arriving at the station; and
    propelling the mover along the at least one track segment with the controller after remaining in the at-station operating state for a second predefined time duration.

2. The method of claim 1, wherein the step of using the alternate set of controller gains to control operation of the mover at the station further includes removing power from at least one coil located along the at least one track segment, wherein the at least one coil is configured to generate an electromagnetic field to propel the mover.

3. The method of claim 1, wherein the step of generating the signal with the controller responsive to the mover arriving at the station further comprises the steps of:
    obtaining a present location of the mover along the at least one track segment from a position feedback system in the independent cart system; and
    generating the signal when the present location of the mover is within a predefined distance from a position of the station.

4. The method of claim 1, wherein the step of generating the signal with the controller responsive to the mover arriving at the station further comprises the steps of:
    obtaining a present velocity of the mover as it travels along the at least one track segment; and
    generating the signal when the present velocity of the mover is less than a predefined velocity.

5. The method of claim 1, wherein the independent cart system includes a linear drive system to propel the mover along the at least one track segment and wherein using the alternate set of controller gains to control operation of the mover at the station further comprises the step of:
    monitoring a present location of the mover along the at least one track segment as the at least one mover is propelled along the at least one track segment by an actuator other than the linear drive system.

6. The method of claim 1, wherein:
    the mover is propelled in a first direction and a second direction, opposite the first direction, along the at least one track segment,
    the steps of generating the signal with the controller responsive to the mover arriving at the station located along the at least one track segment, reading the alternate set of controller gains from the non-transitory memory in the controller, using the alternate set of controller gains to control operation of the mover at the station at the first predefined time duration after generating the signal, and propelling the mover along the at least one track segment with the controller after remaining in the at-station operating state for the second predefined time duration are only performed when the mover is propelled in the first direction.

7. A system for controlling a mover in an independent cart system, the system comprising:
    at least one track segment, wherein the at least one track segment includes:
        a plurality of drive coils positioned along a length of the at least one track segment, and
        a controller configured to selectively energize the plurality of drive coils; and at least one mover including a drive member, wherein:
the drive member is configured to propel the at least one mover along the at least one track segment responsive to the controller selectively energizing the plurality of drive coils, and
the controller is further configured to:
operate in a first operating state to propel the at least one mover along the at least one track segment using a first set of controller gains,
generate a signal responsive to the at least one mover arriving at a station along the at least one track segment,
read an alternate set of controller gains from a non-transitory memory in the controller, wherein the alternate set of controller gains is different than the first set of controller gains,
control operation of the at least one mover using the alternate set of controller gains after the at least one mover remains at the station for a first predefined time duration, and
resume operation in an operating state other than the at-station operating state to propel the at least one mover along the at least one track segment after the at least one mover remains at the station for a second predefined time duration.

8. The system of claim 7, wherein the controller is further configured to remove power from at least one of the plurality of drive coils located proximate the at least one mover while controlling operation of the at least one mover using the alternate set of controller gains.

9. The system of claim 7, further comprising:
a position feedback system configured to generate a feedback signal corresponding to a present location of the at least one mover along the track segment, wherein the controller is further configured to generate the signal responsive to the at least one mover arriving at the station along the at least one track segment by:
reading the feedback signal to obtain the present location of the at least one mover; and
generate the signal when the present location of the mover is within a predefined distance from a position of the station.

10. The system of claim 7, wherein the controller is further configured to generate the signal responsive to the at least one mover arriving at the station along the at least one track segment by:
obtaining a present velocity of the at least one mover as it travels along the at least one track segment; and
generating the signal when the present velocity of the mover is less than a predefined velocity.

11. The system of claim 7, further comprising:
a position feedback system configured to generate a feedback signal corresponding to a present location of the at least one mover along the at least one track segment, wherein the controller is further configured to monitor the present location of the at least one mover along the at least one track segment as the at least one mover is propelled along the at least one track segment by an actuator other than the plurality of drive coils.

12. A non-transitory computer-readable storage medium storing instructions for execution by a processor that, when executed, comprise the steps of:
propelling a mover along at least one track segment of an independent cart system using a first set of controller gains;
generating a signal with a controller in the at least one track segment responsive to the mover arriving at a station located along the at least one track segment;
reading an alternate set of controller gains from a non-transitory memory in the controller, wherein the alternate set of controller gains is different than the first set of controller gains;
using the alternate set of controller gains to control operation of the mover at the station at a first predefined time duration after generating the signal responsive to the mover arriving at the station; and
propelling the mover along the at least one track segment with the controller after remaining in the at-station operating state for a second predefined time duration.

13. The non-transitory computer-readable storage medium of claim 12, wherein the step of using the alternate set of controller gains to control operation of the mover at the station state further includes removing power from at least one coil located along the at least one track segment, wherein the at least one coil is configured to generate an electromagnetic field to propel the mover.

14. The non-transitory computer-readable storage medium of claim 12, wherein the step of generating the signal with the controller responsive to the mover arriving at the station further comprises the steps of:
obtaining a present location of the mover along the at least one track segment from a position feedback system in the independent cart system; and
generating the signal when the present location of the mover is within a predefined distance from a position of the station.

15. The non-transitory computer-readable storage medium of claim 12, wherein the step of generating the signal with the controller responsive to the mover arriving at the station further comprises the steps of:
obtaining a present velocity of the mover as it travels along the at least one track segment; and
generating the signal when a present velocity of the mover is less than a predefined velocity.

16. The non-transitory computer-readable storage medium of claim 12, wherein the independent cart system includes a linear drive system to propel the mover along the at least one track segment and wherein using the alternate set of controller gains to control operation of the mover at the station further comprises the step of:
monitoring a present location of the mover along the at least one track segment as the at least one mover is propelled along the at least one track segment by an actuator other than the linear drive system.

17. The non-transitory computer-readable storage medium of claim 12, wherein:
the mover is propelled in a first direction and a second direction, opposite the first direction, along the at least one track segment,
the steps of generating the signal with the controller responsive to the mover arriving at the station located along the at least one track segment, reading an alternate set of controller gains from a non-transitory memory in the controller, using the alternate set of controller gains to control operation of the mover at the station, and propelling the mover along the at least one track segment with the controller after remaining in the at-station operating state for the second predefined time duration are only performed when the mover is propelled in the first direction.

* * * * *